United States Patent
Jo et al.

(10) Patent No.: US 11,777,086 B2
(45) Date of Patent: Oct. 3, 2023

(54) MULTILAYER ANODE AND LITHIUM SECONDARY BATTERY INCLUDING THE SAME

(71) Applicant: SK Innovation Co., Ltd., Seoul (KR)

(72) Inventors: Byoung Wook Jo, Daejeon (KR); Jae Kyu Jin, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/898,570

(22) Filed: Aug. 30, 2022

(65) Prior Publication Data

US 2022/0416233 A1    Dec. 29, 2022

Related U.S. Application Data

(63) Continuation of application No. 16/572,034, filed on Sep. 16, 2019, now Pat. No. 11,476,455.

(30) Foreign Application Priority Data

Sep. 14, 2018    (KR) .................. 10-2018-0110336

(51) Int. Cl.
*H01M 4/36*     (2006.01)
*H01M 4/587*    (2010.01)
*H01M 10/0525*  (2010.01)
*H01M 4/02*     (2006.01)

(52) U.S. Cl.
CPC .......... *H01M 4/366* (2013.01); *H01M 4/587* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | |
|---|---|---|
| 2003/0054249 A1 | 3/2003 | Yamamoto et al. |
| 2017/0125806 A1 | 5/2017 | Wang et al. |
| 2018/0062158 A1 | 3/2018 | Kim et al. |

FOREIGN PATENT DOCUMENTS

| | | |
|---|---|---|
| CN | 106797020 A | 5/2017 |
| CN | 107785535 A | 3/2018 |
| KR | 10-0485336 B1 | 4/2005 |
| KR | 2017-0107213 A | 9/2017 |

(Continued)

OTHER PUBLICATIONS

Machine translation of KR20170107213 (Year: 2017).*

(Continued)

*Primary Examiner* — Wyatt P McConnell
(74) *Attorney, Agent, or Firm* — IP & T GROUP LLP

(57) ABSTRACT

A multilayer anode includes an anode collector, and a plurality of anode mixture layers sequentially stacked on at least one surface of the anode collector, and including natural graphite as an anode active material. A weight ratio of the natural graphite in innermost and outermost anode mixture layers is greater than a weight ratio of the natural graphite in an anode mixture layer located between the innermost and outermost anode mixture layers, in a stacking direction of the plurality of anode mixture layers. Performance of a cell may be improved and calendering-calender contamination occurring in a calendering process and an electrode stripping phenomenon may be prevented.

10 Claims, 3 Drawing Sheets

(56) References Cited

FOREIGN PATENT DOCUMENTS

KR      20170107213     *  9/2017
WO     2018062836 A2   4/2018

OTHER PUBLICATIONS

Non-Final Rejection for the U.S. Appl. No. 16/572,034 issued by the USPTO dated Jul. 2, 2021.
Final Rejection for the U.S. Appl. No. 16/572,034 issued by the USPTO dated Oct. 18, 2021.
Office Action issued by the CNIPA for Application No. CN 201910864199.5, dated Jun. 12, 2023.

* cited by examiner

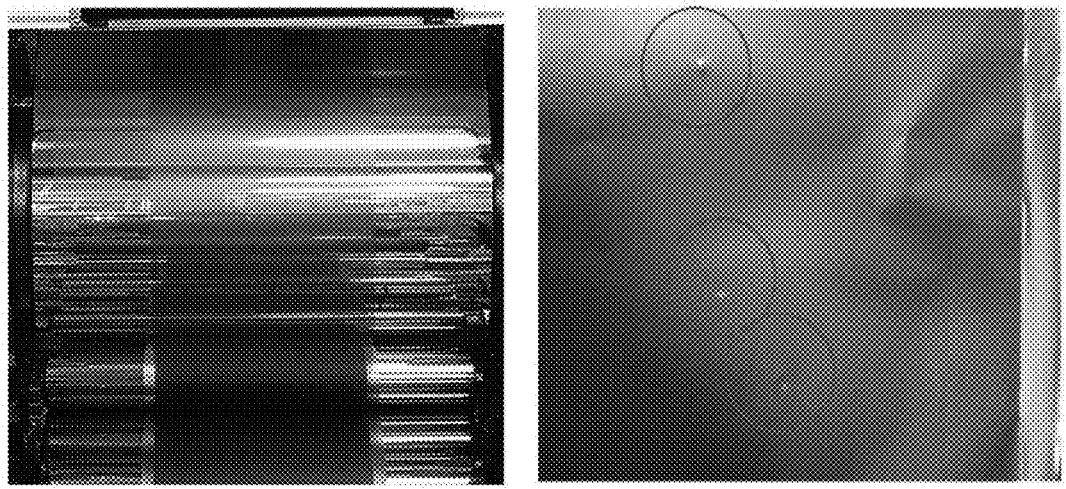
FIG. 4
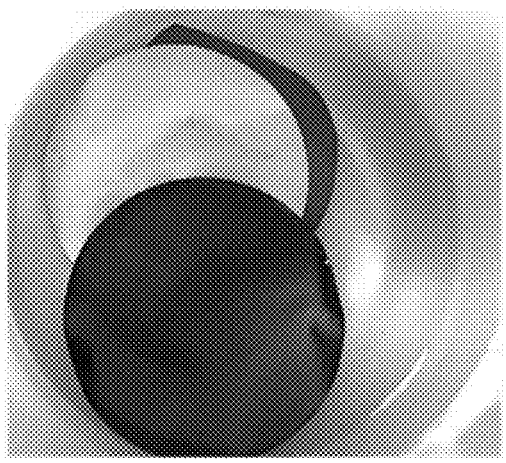 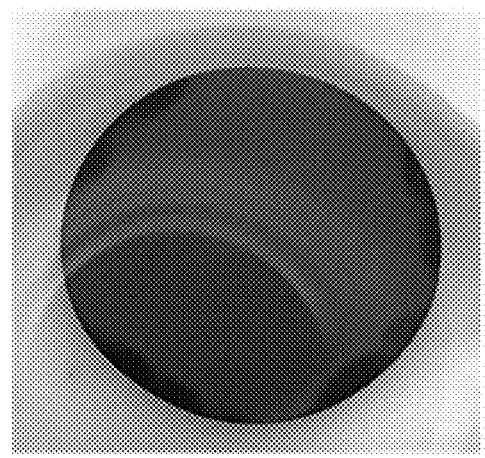
FIG. 5A          FIG. 5B

MULTILAYER ANODE AND LITHIUM SECONDARY BATTERY INCLUDING THE SAME

CROSS-REFERENCE TO RELATED APPLICATION(S)

This application is a continuation of U.S. patent application Ser. No. 16/572,034 filed on Sep. 16, 2019, which claims the benefit under 35 USC 119(a) of Korean Patent Application No. 10-2018-0110336 filed on Sep. 14, 2018 in the Korean Intellectual Property Office, the entire disclosure of which is incorporated herein by reference for all purposes.

BACKGROUND

The present disclosure relates to an anode including a multilayer anode mixture layer, and more particularly, to a multilayer anode with multiple layers having different contents of natural graphite contained as an anode active material in an anode mixture layer, and a lithium secondary battery including the same.

As technological development and demand for mobile devices have increased, there has been a rapid increase in demand for secondary batteries as energy sources. Among such secondary batteries, lithium secondary batteries, exhibiting high energy density and operating potential and which have a long cycle life and a low self-discharge rate, have been commercialized and widely used.

As interest in environmental issues has increased in recent years, research into electric vehicles (EVs) and hybrid electric vehicles (HEVs), which may replace fossil-fueled vehicles such as gasoline vehicles, diesel vehicles and the like, significant causes of air pollution, has been conducted. Lithium secondary batteries having high energy density, high discharge voltage and output stability have mainly been researched and used as power sources for electric vehicles (EVs) and hybrid electric vehicles (HEVs).

Such a lithium secondary battery is under development as a model capable of implementing a high voltage and a high capacity in line with consumer demand. To implement a high capacity thereof, a lithium secondary battery is required to have an optimization process of a cathode material, an anode material, a separator, and an electrolyte, four elements of the lithium secondary battery, within a limited space.

On the other hand, the use of artificial graphite in the place of natural graphite as an anode active material has been increasing in recent years in order to improve cell lifespan and the like in the production of an anode used in a secondary battery. However, as the artificial graphite content increases, the adhesive force between a current collector and an electrode is lowered, and a phenomenon in which the electrode is separated from a substrate in the electrolyte may be serious.

Further, in the process of calendering an electrode using artificial graphite, an active material on the surface of an electrode mixture layer is deposited on a calendering calender, and thus, calender contamination becomes serious, which causes a problem in which productivity in a calendering process is significantly lowered.

SUMMARY

An aspect of the present disclosure is to provide a multilayer anode in which calendering-calender contamination occurring in a calendering process and an electrode stripping phenomenon may be prevented, and a lithium secondary battery including the same.

According to an embodiment of the present disclosure, a multilayer anode includes an anode collector, and a plurality of anode mixture layers sequentially stacked on at least one surface of the anode collector and including natural graphite as an anode active material. A weight ratio of the natural graphite in innermost and outermost anode mixture layers is greater than a weight ratio of the natural graphite in an anode mixture layer located between the innermost and outermost anode mixture layers in a stacking direction, from among the plurality of anode mixture layers.

The anode mixture layer may be comprised of three or more layers.

A weight ratio of the natural graphite in portions of the plurality of anode mixture layers, corresponding to 0 to 20% and 80 to 100% of a total height of the plurality of anode mixture layers, from the anode collector, in a thickness direction of the plurality of anode mixture layers, may be greater than a weight ratio in a portion of the plurality of anode mixture layers, except for the portions thereof.

The natural graphite of the innermost anode mixture layer may be contained in an amount of 50 to 100 wt % based on a total active material weight of the innermost anode mixture layer.

The natural graphite of the outermost anode mixture layer may be contained in an amount of 50 to 100 wt % based on a total active material weight of the outermost anode mixture layer.

The anode mixture layer may further include one or more anode active materials selected from artificial graphite, natural graphite, soft carbon, hard carbon, acetylene carbon black, Ketjen black, carbon nanotubes, carbon nanofiber and silicon oxide.

The plurality of anode mixture layers may further include a binder and a conductive material.

According to an embodiment of the present disclosure, a lithium secondary battery including the multilayer anode as described above is provided.

BRIEF DESCRIPTION OF DRAWINGS

The above and other aspects, features, and advantages of the present disclosure will be more clearly understood from the following detailed description, taken in conjunction with the accompanying drawings, in which:

FIG. 4 is an image showing a calendering calender after manufacturing an anode according to Comparative Example 1 of the present disclosure; and FIG. 5A is an image in Comparative Example 1 and FIG. 5B is an image in Embodiment Example 2 of the present disclosure, respectively illustrating the degree of anode stripping after impregnation of an anode with an electrolyte, for comparison therebetween.

DETAILED DESCRIPTION

Figure 1:
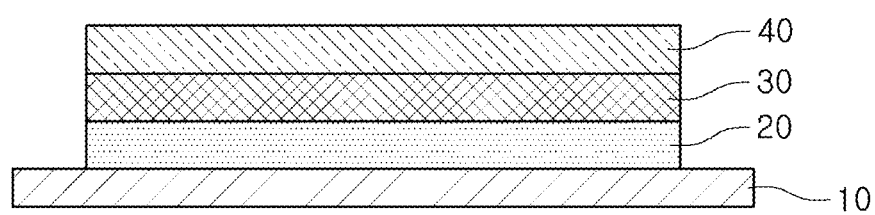
FIG. 1 schematically illustrates a multilayer anode according to an embodiment of the present disclosure.
Figure 2:
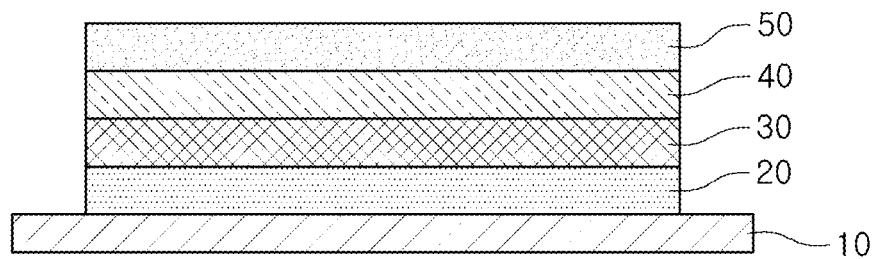
FIG. 2 schematically illustrates a multilayer anode according to another embodiment of the present disclosure.

The following detailed description is provided to assist the reader in gaining a comprehensive understanding of the methods, apparatuses, and/or systems described herein.

However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

The drawings may not be to scale, and the relative size, proportions, and depiction of elements in the drawings may be exaggerated for clarity, illustration, and convenience.

Hereinafter, embodiments of the present disclosure will be described with reference to various embodiments. However, the embodiments of the present disclosure can be modified into various other forms, and the scope of the present disclosure is not limited to the embodiments described below.

A multilayer anode and a lithium secondary battery including the same are provided. The secondary battery is formed by forming an electrode assembly by interposing a separator between a cathode and an anode, to be wound or stacked, and by storing the electrode assembly inside a case and then filling the case with an electrolyte. The electrode, for example, the cathode and the anode of the secondary battery are formed by applying a cathode active material or an anode active material on a current collector and calendering the same. For example, in performing a calendering process of the electrode, the electrode coated with an electrode active material is passed between an upper calender and a lower calender.

In such a secondary battery calendering apparatus, an active material and a binder on the surface of the electrode stain the calendering calender in a high-pressure calendering process, thereby causing a problem of calender contamination. In a case in which the calender is contaminated, an active material aggregate present in a mixture layer moves to the calender, causing cyclic sticking problems. Therefore, in a case in which the calender is contaminated, it is necessary to clean the calender. Therefore, productivity may be lowered due to an increase in process time and cost.

The use of artificial graphite as an anode active material instead of natural graphite has been increasing in recent years, but as the artificial graphite content in the electrode is increased, the adhesion between a current collector and an electrode is lowered, and thus, the electrode may be separated from a substrate in an impregnation state of an electrolyte.

A multilayer anode according to an embodiment includes an anode collector 10, and a plurality of anode mixture layers sequentially stacked on at least one surface of the anode collector 10, and including natural graphite as an anode active material. In this case, a weight ratio of the natural graphite in innermost and outermost anode mixture layers is greater than a weight ratio of the natural graphite in an anode mixture layer located between the innermost and outermost anode mixture layers, in a stacking direction of the plurality of anode mixture layers.

The anode mixture layers may be comprised of at least three layers. For example, the anode mixture layers may be comprised of a first anode mixture layer 20 formed on an innermost side to be in contact with the current collector in the stacking direction of the anode mixture layers, a second anode mixture layer 30 formed on the first anode mixture layer 20, and a third anode mixture layer 40 disposed on the second anode mixture layer 30 and disposed on an outermost side in the stacking direction of the anode mixture layers. If necessary, a fourth anode mixture layer 50 may be formed on the third anode mixture layer 40. In this case, the anode mixture layer in which the fourth anode mixture layer 50 is an outermost anode mixture layer may be provided.

The number of the anode mixture layers is not particularly limited, but in detail, may be 3 to 4 layers. If the number of the anode mixture layers exceeds 4 layers, a process cost increases due to an additional process, and furthermore, a manufacturing yield decreases due to a repeated application process.

To prevent the above-described calender contamination and electrode stripping phenomenon, and to secure output and lifespan characteristics of the battery, a weight ratio of the natural graphite in portions of the plurality of anode mixture layers, corresponding to 0 to 20% and 80 to 100% of a total height of the plurality of anode mixture layers, from the anode collector, in a thickness direction of the anode mixture layers, may be greater than a weight ratio of the natural graphite in a portion of the plurality of anode mixture layers, except for the portions thereof. For example, when a region of 0 to 20% of the total height of the plurality of anode mixture layers is defined as A, a region of 21 to 79% thereof is defined as B, and a region of 80 to 100% is defined as C, the ratios of the contents of natural graphite contained in respective regions may be, in detail, A/B>1 and C/B>1.

As described later, the anode mixture layer according to an embodiment may further include an anode active material such as artificial graphite, soft carbon, hard carbon, acetylene carbon black, Ketjen black, carbon nanotubes, carbon nanofiber, silicon oxide and the like, in addition to natural graphite. In this case, a relatively large amount of natural graphite is contained in a range of 0 to 20% of the total height of the plurality of anode mixture layers, for example, in a portion thereof contacting the anode collector 10, thereby improving the adhesion between the collector and the electrode and preventing an electrode stripping phenomenon. Further, a relatively large amount of natural graphite is contained in a range of 80% to 100% of the total height of the plurality of anode mixture layers, for example, in a portion thereof in which the calender and the anode mixture layer are in contact with each other, thereby reducing calender contamination. In addition, the content of an active material such as artificial graphite is increased in the remaining portion, thereby ensuring lifespan characteristics and output characteristics of the entire battery.

For example, the number of the anode mixture layers may be three or four. In this case, the multilayer anode according to an embodiment may be configured in such a manner that an amount of the natural graphite contained in the innermost and outermost anode mixture layers in the stacking direction of the anode mixture layers is more than an amount of natural graphite contained in the entire anode mixture layer.

As described above, according to an embodiment, the occurrence of a problem of a manufacturing process may be prevented without significantly decreasing the ratio of the total artificial graphite amount by increasing the content of the natural graphite only in a region in which anode stripping and calendering calender contamination problems occur in the electrode mixture layers. In more detail, since particle deformation of natural graphite is relatively facilitated as compared with that of artificial graphite and spring-back force generated in the calendering process is thus relatively low, shear stress occurring between a rotating calendering calender and the anode mixture layers is reduced. as the shear stress decreases, separation of an inner layer of graphite is difficult. As a result, by increasing the outermost natural graphite content, calender contamination is significantly reduced even after high-pressure calendering. Further, in the case of natural graphite having the same particle size as that of artificial graphite, since the surface area of the natural graphite is smaller than that of a modular artificial graphite, binding force thereof with the current collector is higher than that of the artificial graphite even using the same binder content. As a result, a phenomenon in which the collector and the electrode mixture layers are separated from each other due to penetration of an electrolyte may be prevented by increasing the content of natural graphite in an innermost anode mixture layer.

As a result, according to an embodiment of the present disclosure, occurrence of an anode stripping phenomenon and calendering calender contamination may be prevented while improving cell performance.

On the other hand, the natural graphite of the innermost anode mixture layer may be contained in an amount of 50 to 100 wt %, in more detail, 70 to 90 wt %, based on the total active material weight of the innermost anode mixture layer. If the content of natural graphite is 50 wt % or less, the adhesive force between the anode mixture layer and the current collector is not sufficient, and an electrode stripping phenomenon may occur after impregnation with the electrolyte.

The natural graphite of an outermost anode mixture layer may be contained in an amount of 50 to 100 wt %, in more detail, 70 to 90 wt %, based on the total weight of an active material of the outermost anode mixture layer. If the content of natural graphite is 50 wt % or less, it is difficult to reduce the problem of calender contamination by artificial graphite.

In an embodiment, the anode mixture layer may further include one or more anode active materials in addition to natural graphite as an anode active material. The kind of the anode active material is not particularly limited. For example, artificial graphite, soft carbon, hard carbon, acetylene carbon black, Ketjen black, carbon nanotubes, carbon nanofiber, silicon oxide and the like may be used.

The anode mixture layer may further include a binder and a conductive material, as required. The binder is a component that assists in bonding between the active material and a conductive material and bonding to a current collector. A material used as the binder is not particularly limited, but polyvinylidene fluoride (PVDF), polyvinyl alcohol, Carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butylene rubber (SBR), fluorine rubber, or a mussel protein, a polyacrylate-based binder, a polyolefin-based binder, a silane-based binder and the like may be used, and in detail, one or more selected from PVDF, SBR, a mussel protein, a polyolefin based binder, a polyacrylate-based binder, and a silane-based binder may be used. In addition, the kinds of the binders used in the anode mixture layers may be the same as each other or may be different from each other.

The conductive material is not particularly limited as long as it is a substance included for improving electronic conductivity and has conductivity without causing chemical change in the battery. For example, as the conductive material, graphite such as natural graphite or artificial graphite; carbon black such as carbon black, acetylene black, Ketjen black, channel black, furnace black, lamp black, thermal black or the like; a conductive fiber such as carbon fiber and metal fiber; a metal powder such as carbon fluoride powder, aluminum powder, nickel powder or the like, a conductive whisker such as zinc oxide, potassium titanate or the like, a conductive metal oxide such as titanium oxide or the like, a conductive material such as polyphenylene derivatives, carbon nanotubes, grapheme or the like, and the like may be used. The types of the conductive materials used in the respective anode mixture layers may be the same or different from each other.

A method of manufacturing a multilayer anode according to an embodiment is not particularly limited, and an anode active material slurry may be prepared according to a known method, and a method of coating an anode collector with the active materials may also be performed using a known method.

According to another embodiment, a lithium secondary battery including the above-described multilayer electrode may be provided, and an anode stripping phenomenon may be prevented while improving performance of a cell.

EMBODIMENT EXAMPLES

Hereinafter, the present disclosure will be described in more detail with reference to example embodiments. The following examples are intended to further illustrate the present disclosure and are not intended to limit the present disclosure.

Embodiment Example 1

As a binder, carboxymethyl cellulose (CMC) and styrene-butadiene rubber (SBR) were mixed in an amount of 1.0 wt % and 2.0 wt %, respectively, and natural graphite and artificial graphite were mixed in an amount of 67.9 wt % and 29.1 wt %, respectively, as an anode active material. Distilled water was added such that an ultimate solid weight was about 52% to be mixed for 150 minutes to prepare first and third layer anode slurries.

Carboxymethyl cellulose (CMC) and styrene-butadiene rubber (SBR) as a binder, and artificial graphite as an anode active material, were mixed in an amount of 1.0 wt %, 2.0 wt %, and 97 wt %, respectively. Then, distilled water was added such that an ultimate solid weight was about 52%, to be mixed for 150 minutes to prepare second layer anode slurry.

The first layer anode slurry was applied to one side of a copper foil (having a thickness of 6 μm) to a thickness of 32 μm and was then applied to the opposite side to have the same thickness, followed by drying. The second layer anode slurry was applied to one side of a first anode mixture layer dried as described above to a thickness of 86 μm and was then applied to the opposite side thereof to have the same thickness, followed by drying. Ultimately, the third layer anode slurry was applied to one side of a second anode mixture layer dried as described above to a thickness of 32 μm and was then applied to the opposite side thereof to have the same thickness, followed by drying.

Figure 3:
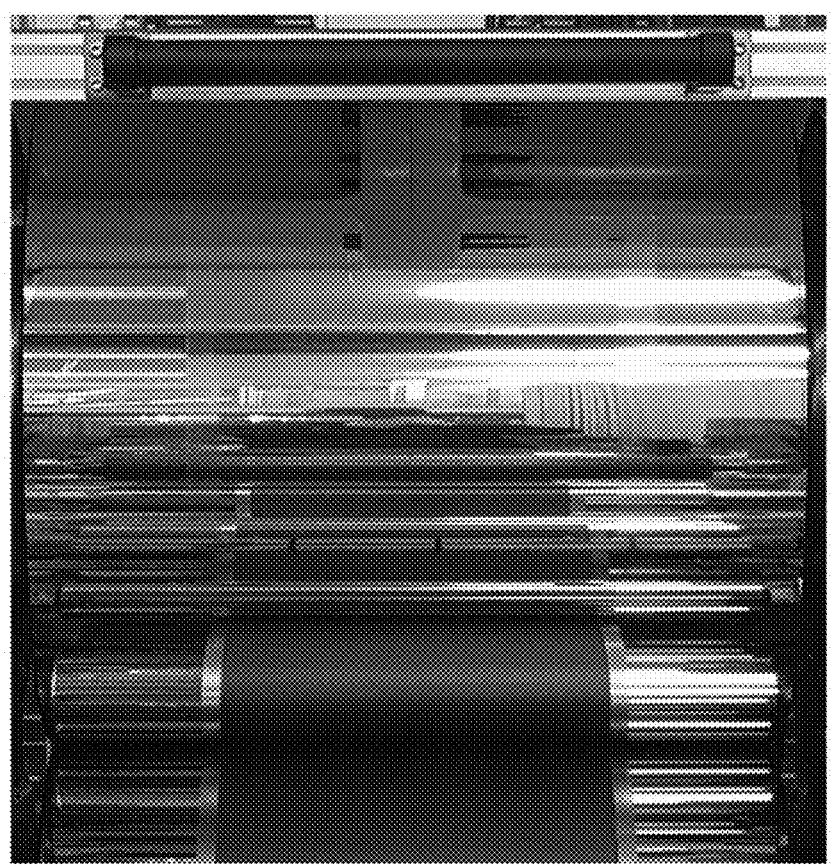
FIG. 3 is an image showing a calendering calender after manufacturing an anode according to Embodiment Example 2 of the present disclosure.

Thereafter, about 1,000 m of the dried anode mixture layer was calendered by using the apparatus illustrated in FIG. 3 to prepare an anode having an electrode thickness of 90 μm on one surface thereof.

Embodiment Example 2

Carboxymethyl cellulose (CMC) and styrene-butadiene rubber (SBR) were mixed as the binder in an amount of 1.0 wt % and 2.0 wt %, respectively, and natural graphite and artificial graphite were mixed as an anode active material in an amount of 87.3 wt % and 9.7 wt %, respectively, and distilled water was then added thereto such that an ultimate solid weight was about 52% to be mixed for 150 minutes to prepare first and third layer anode slurries.

Carboxymethyl cellulose (CMC) and styrene-butadiene rubber (SBR) as a binder, and artificial graphite as an anode active material, were mixed in an amount of 1.0 wt %, 2.0 wt %, and 97 wt %, respectively. Then, distilled water was added such that an ultimate solid weight was about 52%, to be mixed for 150 minutes to prepare second layer anode slurry.

The first layer anode slurry was applied to one side of a copper foil (having a thickness of 6 μm) to a thickness of 25 μm and was then applied to the opposite side thereof to have the same thickness, followed by drying. The second layer anode slurry was applied to one side of a first anode mixture layer dried as described above to a thickness of 99 μm and was then applied to the opposite side thereof to have the same thickness, followed by drying. Ultimately, the third layer anode slurry was applied to one side of a second anode mixture layer dried as described above to a thickness of 25 μm and was then applied to the opposite side thereof to have the same thickness, followed by drying.

Thereafter, about 1,000 m of the dried anode mixture layer was calendered by using the apparatus illustrated in FIG. 3 to prepare an anode having an electrode thickness of 90 μm on one surface thereof.

FIG. 3 illustrates a calender used for calendering the anode. Referring to FIG. 4 showing a calender used for calendering an anode of Comparative Example 1 to be described later, it can be confirmed that a calender surface is stained with an extremely small amount of an active.

Comparative Example 1

Carboxymethyl cellulose (CMC) and styrene-butadiene rubber (SBR) were mixed as a binder in an amount of 1.0 wt % and 2.0 wt %, respectively, and natural graphite and artificial graphite were mixed as an anode active material in an amount of 9.7 wt % and 87.3 wt %, respectively, and distilled water was then added thereto such that an ultimate solid weight was about 52%, to be mixed for 150 minutes to prepare an anode slurry.

The anode slurry was applied to one side of a copper foil (having a thickness of 6 μm) to a thickness of 150 μm and was then applied to the opposite side thereof to have the same thickness, followed by drying.

Thereafter, about 1,000 m of an anode mixture layer dried as described above was calendered by using the apparatus illustrated in FIG. 3, to prepare an anode having an electrode thickness of 90 μm on one surface thereof.

FIG. 4 illustrates a calender used for calendering the anode. As described above, it can be confirmed that the active material mass moves to the calender during a calendering process due to serious contamination of the calender, and the calendered anode mixture layer is struck.

Comparative Example 2

Carboxymethyl cellulose (CMC) and styrene-butadiene rubber (SBR) were mixed as a binder in an amount of 1.0 wt % and 2.0 wt %, respectively, and natural graphite and artificial graphite were mixed as an anode active material in an amount of 29.1 wt % and 67.9 wt %, respectively, and distilled water was then added thereto such that an ultimate solid weight was about 52%, to be mixed for 150 minutes to prepare an anode slurry.

The anode slurry was applied to one side of a copper foil (having a thickness of 6 μm) to a thickness of 150 μm and was then applied to the opposite side thereof to have the same thickness, followed by drying.

Thereafter, about 1,000 m of an anode mixture layer dried as described above was calendered by using the apparatus illustrated in FIG. 3, to prepare an anode having an electrode thickness of 90 μm on one surface thereof.

Comparative Example 3

Carboxymethyl cellulose (CMC) and styrene-butadiene rubber (SBR) were mixed as a binder in an amount of 1.0 wt % and 2.0 wt %, respectively, and natural graphite and artificial graphite were mixed as an anode active material in an amount of 48.5 wt % and 48.5 wt %, respectively, and distilled water was then added thereto such that an ultimate solid weight was about 52%, to be mixed for 150 minutes to prepare an anode slurry.

The anode slurry was applied to one side of a copper foil (having a thickness of 6 μm) to a thickness of 150 μm and was then applied to the opposite side thereof to have the same thickness, followed by drying.

Thereafter, about 1,000 m of an anode mixture layer dried as described above was calendered by using the apparatus illustrated in FIG. 3, to prepare an anode having an electrode thickness of 90 μm on one surface thereof.

Comparative Example 4

Carboxymethyl cellulose (CMC) and styrene-butadiene rubber (SBR) were mixed as a binder in an amount of 1.0 wt % and 2.0 wt %, respectively, and natural graphite and artificial graphite were mixed as an anode active material in an amount of 67.9 wt % and 29.1 wt %, respectively, and distilled water was then added thereto such that an ultimate solid weight was about 52%, to be mixed for 150 minutes to prepare a first layer anode slurry.

Carboxymethyl cellulose (CMC) and styrene-butadiene rubber (SBR) were mixed as a binder in an amount of 1.0 wt % and 2.0 wt %, respectively, and natural graphite and artificial graphite were mixed as an anode active material in an amount of 9.7 wt % and 87.3 wt %, respectively, and distilled water was then added thereto such that an ultimate solid weight was about 52%, to be mixed for 150 minutes to prepare a second layer anode slurry.

The first layer anode slurry was applied to one side of a copper foil (having a thickness of 6 μm) to a thickness of 50 μm and was then applied to the opposite side thereof to have the same thickness, followed by drying. The second layer anode slurry was applied to one side of a first anode mixture layer dried as described above to a thickness of 100 μm and was then applied to the opposite side thereof to have the same thickness, followed by drying.

Thereafter, about 1,000 m of the dried anode mixture layer was calendered by using the apparatus illustrated in FIG. 3, to prepare an anode having an electrode thickness of 90 μm on one surface thereof.

EXPERIMENTAL EXAMPLE

Measurement of Collector Adhesion

To measure adhesive force between a mixture layer and a current collector in anodes prepared in Embodiment Examples 1 and 2 and Comparative Examples 1 to 4, a 3M tape having a 18 mm width was attached onto each electrode and a 90 degree peel test was conducted.

The force at the time of separation of the mixture layer and the current collector was measured, and the adhesive strength of the current collector was calculated by dividing the measured force by the width of the tape. The calculated values are illustrated in Table 1.

Measurement of Electrode Stripping During Impregnation with Electrolyte

The electrodes prepared in Embodiment Examples 1 and 2 and Comparative Examples 1 to 4 were punched into a circle having a diameter of 36 mm and then placed in a plastic bottle filled with 20 ml of an electrolyte to be impregnated in the electrolyte and allowed to stand for 3 hours.

Whether or not the electrolyte penetrated into the mixture layer and whether or not electrode stripping occurred between the anode mixture layer and the current collector were visually observed, and presence and absence of stripping is illustrated in Table 1 as ○ (occurrence of stripping) and x (non-occurrence).

Calendering Calender Electrode Point Measurement

Calendering was carried out at a running speed of 20 m/min for the electrode of 1,000 m prepared in Embodiment Examples 1 and 2 and Comparative Examples 1 to 4. Table 1 illustrates calendering running lengths until active material aggregates are separated from the anode mixture layer due to calender contamination during a calendering process and are attached to the calender, continuously causing damaging on the surface of the electrode.

0.33 C Charge/Discharge Capacity Retention Rate Measurement

A battery was fabricated using the electrodes prepared in Embodiment Examples 1 and 2 and Comparative Examples 1 to 4.

Each prepared battery was charged until the voltage reached 4.2V in a constant current (CC) mode of 1/3 C at a temperature of 45° C. Thereafter, after discharging until the voltage reached 2.5 V in the constant current (CC) mode of 1/3 C, additional discharging continued until a current value was reduced to a level of 0.05% of an initial current value in a constant voltage (CV) mode, and a discharge capacity of a first order was confirmed.

Thereafter, the same charge and discharge operations were performed fora total of 200 times, and a discharge capacity measured in the last order was divided by the discharge capacity of the first order to calculate the 0.33 C charge/discharge capacity retention rate. The calculation results obtained thereby are illustrated in Table 1.

TABLE 1

| Classification | Comparative Example | | | | Embodiment Example | |
|---|---|---|---|---|---|---|
| | 1 | 2 | 3 | 4 | 1 | 2 |
| Total Natural Graphite Content (weight %) | 10 | 30 | 50 | 30 | 30 | 30 |
| Innermost Natural Graphite Content (weight %) | 10 | 30 | 50 | 70 | 70 | 90 |
| Outermost Natural Graphite Content (weight %) | 10 | 30 | 50 | 10 | 70 | 90 |
| Current Collector Adhesive Force (N/cm) | 0.21 | 0.23 | 0.27 | 0.29 | 0.30 | 0.32 |
| Whether or not electrode stripping occurs at the time of impregnation with electrolyte | ○ | ○ | X | X | X | X |
| Calendering Calender Electrode Damaging Point in Time (1,000 m production) | 380 m | 750 m | No Occurrence | 430 m | No Occurrence | No Occurrence |
| 0.33 C Charge/Discharge Capacity Retention Rate (@200 cycle, 45° C.) | 98% | 97% | 92% | 97% | 98% | 98% |

As can be seen from the results of Table 1 and FIGS. 3 to 5, in the case of the electrodes of Embodiment Examples 1 and 2, in which the contents of natural graphite in innermost and outermost anode mixture layers are high as compared with the total natural graphite content; the charge and discharge capacity retention rate was excellent, a stripping phenomenon of the electrode mixture layer did not occur at the time of impregnation with an electrolyte, and a stain or damaging phenomenon of the electrode due to calender contamination during a calendering process did not occur.

Meanwhile, in Comparative Examples 1, 2 and 3 in which the natural graphite contents in the anode mixture layer are all the same as illustrated in Table 1, the retention rate of the charge and discharge capacity increases as the natural graphite content decreases. However, it can be confirmed that electrode stripping occurs during impregnation with an electrolyte, and the point of time when the electrode is struck due to calender contamination during a calendering process is reduced.

In the case of Comparative Example 4, the content of natural graphite on an innermost side of the anode mixture layer was high compared to the total content of natural graphite, such that the stripping of the electrode mixture layer did not occur upon impregnation with electrolyte. However, the natural graphite content in an outermost layer of the anode mixture layer was relatively low, and thus, damaging due to calender contamination during a calendering process occurred at a point of about 430 m.

As set forth above, in a multilayer anode and a lithium secondary battery including the same according to an embodiment, performance of a cell may be improved, calendering-calender contamination occurring in a calendering process and an electrode stripping phenomenon may be prevented.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer anode comprising:
    an anode collector; and a plurality of anode mixture layers on at least one surface of the anode collector,
    wherein the anode mixture layers include an innermost anode mixture layer located on the anode current collector; an outermost anode mixture layer located on an outermost side of the anode; and an intermediate anode mixture layer located between the innermost anode mixture layer and the outermost anode mixture layer, the intermediate anode mixture layer comprising one or more layers,
    wherein, at least one of the innermost anode mixture layer and the outermost anode mixture layer of the anode mixture layer comprises natural graphite as an anode active material,
    wherein the intermediate anode mixture layer is a carbon-based layer comprising a carbon material as anode active material,
    wherein at least one of a weight ratio of the natural graphite in the innermost anode mixture layer over the total anode active material of the innermost anode mixture layer and a weight ratio of the natural graphite in the outermost anode mixture layer over the total anode active material of the outermost anode mixture layer is greater than a weight ratio of natural graphite in the intermediate anode mixture layer over the total anode active material of the intermediate anode mixture layer.

2. The multilayer anode of claim 1, wherein the intermediate anode mixture layer comprises two or more layers.

3. The multilayer anode of claim 1,
    wherein a total height of the plurality of anode mixture layers in the stacking direction is divided in an innermost region occupied by the innermost anode mixture layer, an outermost region occupied by the outermost anode mixture layer and a middle region occupied by the intermediate anode mixture layer located between the innermost anode mixture layer and the outermost anode mixture layer, and wherein the innermost region extends from the anode collector to a first height which is 20% of the total height of the plurality of anode mixture layers in the stacking direction,
    wherein the middle region extends from the first height to a second height of the plurality of anode mixture layers which is 80% of the total height, and
    wherein the outermost region extends from the second height to a third height which is 100% of the total height of the plurality of anode mixture layers.

4. The multilayer anode of claim 1, wherein the natural graphite of the at least one of the innermost anode mixture layer and the outermost anode mixture layer is contained in an amount of 50 to 100 wt % based on a total active material weight of the at least one of the innermost anode mixture layer and the outermost anode mixture layer.

5. The multilayer anode of claim 1,
    wherein both the innermost anode mixture and the outermost anode mixture comprise natural graphite,
    wherein the natural graphite of the innermost anode mixture layer is contained in an amount of 50 to 100 wt % based on a total active material weight of the innermost anode mixture layer, and
    wherein the natural graphite of the outermost anode mixture layer is contained in an amount of 50 to 100 wt % based on a total active material weight of the outermost anode mixture layer.

6. The multilayer anode of claim 1, wherein the intermediate anode mixture layer includes natural graphite as an anode active material.

7. The multilayer anode of claim 1, wherein the plurality of anode mixture layers comprise natural graphite in an amount of 10 to 50% by weight based on the total weight of the anode active material of the entirety of the plurality of anode mixture layers.

8. The multilayer anode of claim 1, wherein the plurality of anode mixture layers comprise one or more anode active materials selected from artificial graphite, natural graphite, soft carbon, hard carbon, acetylene carbon black, Ketjen black, carbon nanotubes, carbon nanofiber and silicon oxide.

9. The multilayer anode of claim 1, wherein the plurality of anode mixture layers further comprise a binder and a conductive material.

10. A lithium secondary battery comprising the multilayer anode according to claim 1.

* * * * *